United States Patent Office 3,091,992
Patented June 4, 1963

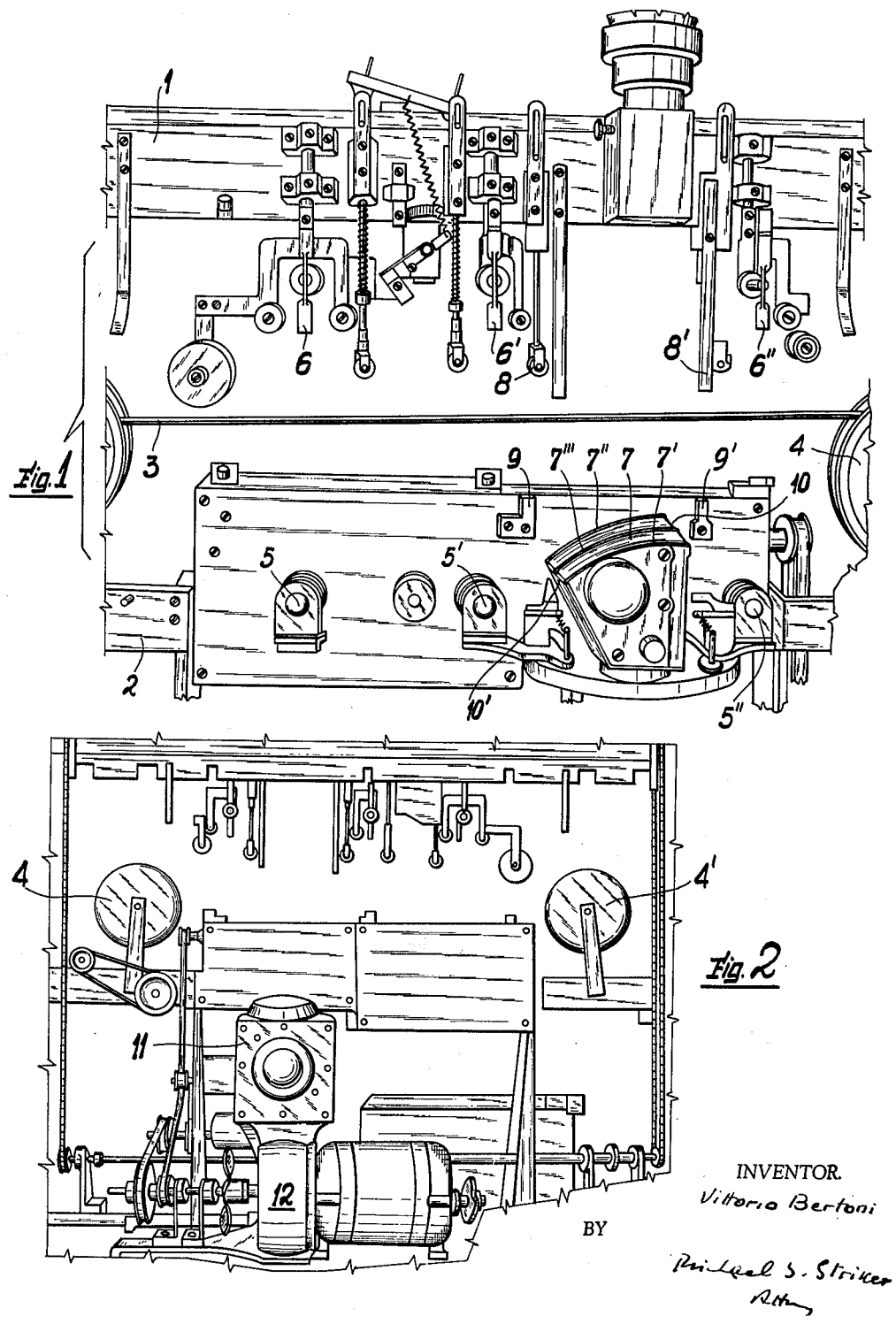

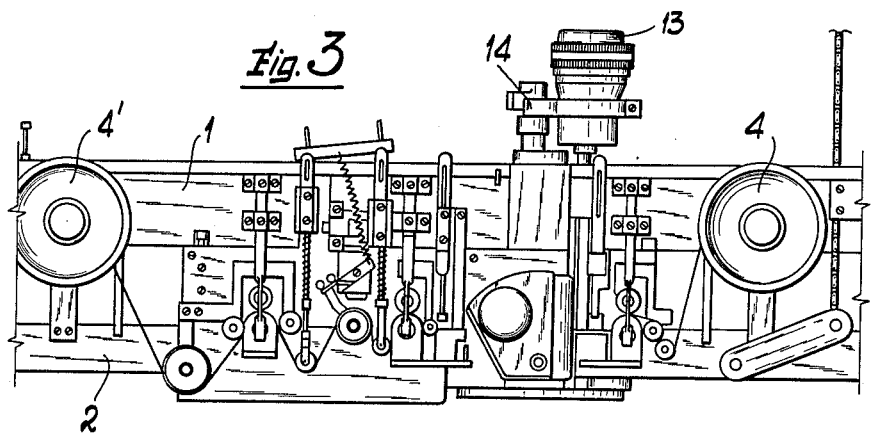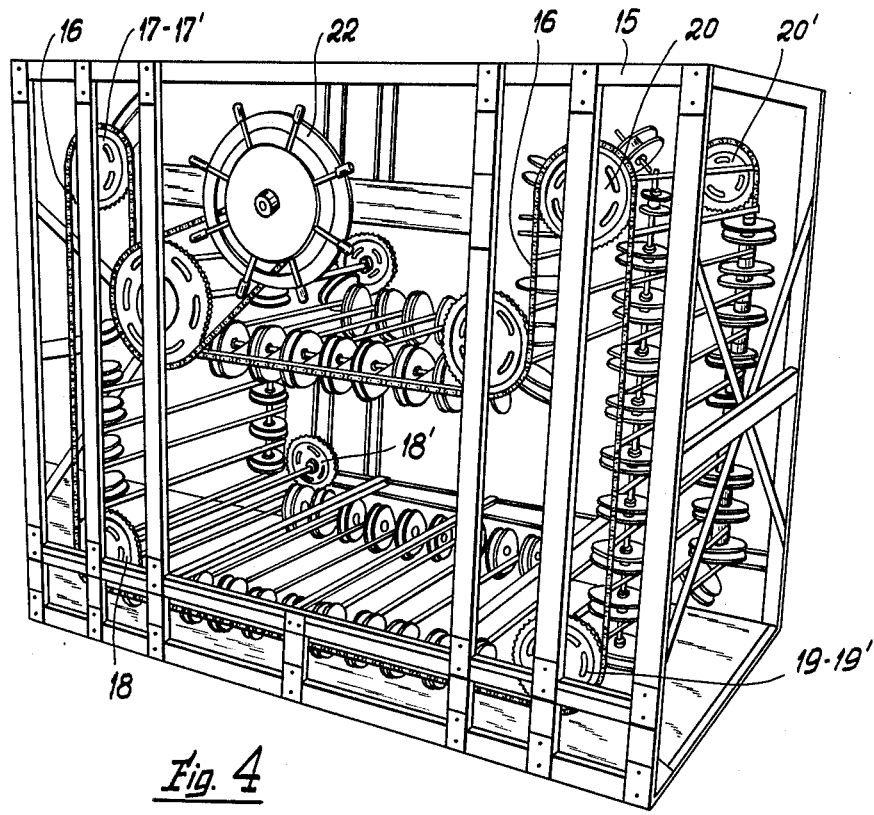

3,091,992
FILM SELECTION AND DRIVE MEANS IN A MULTIPLE FILM PROJECTOR
Vittorio Bertoni, 38 Via Frapolli, Milan, Italy
Filed Nov. 17, 1959, Ser. No. 853,491
Claims priority, application Italy Nov. 18, 1958
3 Claims. (Cl. 88—17)

This invention relates to the art of multiple film projectors, and more particularly, to a multiple film projector operating automatically by means of a selector from an annexed film case, with or without coin introduction.

The problem of an automatic selection of the film holding coil from a film case annexed to the reproducing set presents greater difficulties than the one of a selection of records from a record case. Furthermore, this problem requires more complicated electro-mechanical devices.

The cinematographic projector has preferably a vertical projecting axis, turned towards an overlaying reflecting mirror (not shown in the drawing), is constructed so as to allow the automatic inserting of any film whatever withdrawn from an annexted cinema case, i.e. in two sections, the lower one being fixed, while the upper is shiftable in a vertical direction, so that the film withdrawn may be placed within the free space between the two sections and thereafter be engaged by lowering the upper section on the lower one.

For this purpose, the lower section of this projector is provided with drawing sprockets, a feeding device with sliding guide blocks of a bent shape, a reading device for the sound track (optical and magnetic), a shutter proper for the particular service, and a head with pertinent prism and cell holder with photocell.

The upper section of the projector comprises: an objective holder with objective, a reading telescope of the second track with optical incision and exciter lamp and pertinent support, the set of cams and of pivoting rods and of swinging rolls, cooperating with the drawing sprockets and the other elements forming part of the lower section.

The separation of the two sections by lifting the upper section permits introduction of a film into the space between the separated sections.

The selection of a film from the film case is effected by means of a pushbutton controlling the transport film spools in a special seat in a position with the film suspended over the lower section, while a second push button moves the carriage of the upper section, thereby inserting and pressing the film on the toothed sprockets, on the convex block of the slider and on the sound head (transforming the electric impulses and transmitting them to the loud speakers through the tube amplifier). The film, mounted on a pair of spools, that is a supply spool and a take-up spool, has on both ends (beginning and end) "tails" of metallic bands, provided on one side with the same apertures as the film, and which function as electric contacts and which facilitate also inserting the film in the projector.

The sight projection of the films in transparency on the screen is effected by the luminous rays, vertically departing from the objective and reflected on the screen surface by means of an inclined mirror, placed behind the screen and on the axis of the objective.

The phonic reproduction is effected by little loud speakers, camouflaged on the sides and under the screen, together with the adjusting controls, thus completing the impression of a television apparatus.

A plurality of coils, carrying talking or musical pieces and the pertinent filmed pictures, is assembled in the film case on a system of movable chains, spaced by stretchers and arranged as a double U in closed circuit: the pertinent coils are arranged in the spaces between one stretcher and the other one on special seats; while the shifting of the chains is effected by a selector device outside the piece of furniture permitting the choice of the film as desired and the corresponding shifting of the chains.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a front view of a portion of the apparatus of the present invention;

FIG. 2 is a rear view of the portion shown in FIG. 1 and additional elements of the apparatus of the present invention, drawn to a smaller scale than FIG. 1;

FIG. 3 is a front view similar to FIG. 1 but drawn to a smaller scale and while FIG. 1 shows the two sections of the apparatus separated from each other, FIG. 3 shows the two sections in closed condition and FIG. 4 is a perspective view of the film case used in connection with the apparatus shown in the preceding figures.

FIG. 1 shows a front view of an embodiment of a special projector, conceived as divided into two sections, wherein the upper section 1 is movable in a vertical sense in respect of the lower section 2 which is fixed: without this arrangement the automatic inserting would be impossible between the two sections of the metallic "tail" 3 conducting into the projector the film wound on coil 4. However, it is impossible to obtain the arrangement of the "tail" on the three drive sprockets 5—5'—5", as the teeth of the three crowns could not simultaneously meet in three different points with the apertures of the film in this condition. Therefore, each of said sprockets has been divided into three parts, of which two are interlocked with a pertinent small shaft carried in the lower section, while the toothed crown is held "loose" in an intermediate position between the other parts, with the assistance of a small spacing spring between said crown and the terminal disk. In such a way the film arranges itself easily on the three loose crowns, and in order to block the three parts in a rigid sprocket, small cam levers 6—6'—6" carried by the upper section 1 in corresponding positions, will move, when they descend with said upper section on the lower section 2, the parts overcoming the resistance of the spacing spring, so as to engage radial teeth on opposed faces between toothed crown and terminal disk. In order that the film may be able to rest and to exactly adhere also on the bent sliding block 7 which covers the feeding organ, it is necessary that the film, resting upon the block, may find the supporting space free, so as to remain well adherent to the block in the moment of blocking up between the two sections of the projector and for this purpose, the block is provided with an outside fixed edge 7' and with an elastically shiftable inside edge 7", which, by means of a couple of cams, is held spaced until the film is arranged on the bent block, and with the following blocking up of the two sections, edge 7" will locate the film properly so as to guide it between two parallel edges. In order to prevent the adherence of the film on the block to be opposed by the part of the feeding organ projecting from the curved surface of the block, a device has been conceived synchronizing the advancing stages in such a way that the position of the feeding organ will remain blocked below said surface during the time of separation of the two sections and until the return of the upper section on the lower section.

In view of the regular advancing operation, which is not continuous, but performed by a periodical trip gear, it is also necessary to provide on the high side 10 and on the low side 10' of the feeding box pre-arranged "supplies" of the film, in order to compensate for the periodical advance of the film. For this purpose a couple of release stretchers 8—8' is provided, applied to the upper section 1, with which they descend, acting with terminal loose rolls and with the adjusting assistance of a couple of "cams" 9—9', fixed to the lower section 2.

In FIG. 2 the rear side of the unit is shown, with section 1 in lifted position. FIG. 2 shows the parts illustrated in FIG. 1 in reversed position; and furthermore the lighting device of the projection in form of a lantern 11, and a cooling motor driven ventilator 12.

In FIG. 3 the front view is shown like in FIG. 1, but with section 1 lowered in contact with section 2 and with an interposed film (on spools 4—4'), blocked in working position. The additional objective 13, for "cinescope" projection is visible, with a rotatable support 14 permitting turning of objective 13 through an angle of 180° to be superposed on the normal objective or respectively to leave the latter free for a normal projection.

In FIG. 4 is shown in perspective an example of embodiment of the unit cine case. In the frame 15 pluralities of spools or reels are assembled, respectively carrying films. The reels are carried, separated by stretchers on a couple of chains 16—16' which are movable on toothed wheels 17—17', 18—18', 19—19', 20—20', said chains being arranged as double U in a closed circuit. Shifting of the chain is effected by means of the selecting helm located outside the piece of furniture, and allowing the choice and positioning withdrawing of each film as desired.

An electric control which may be operated by means of introducing coins, deblocks the selecting helm, allowing its operation in order to rotate the chains together with the film. At the end of the projection, the terminal "tail" of the film will automatically stop the working, by discontinuing the current.

What is claimed as new and useful and desired to be secured by Letters Patent is:

1. In a multiple film projector, in combination, a plurality of pairs of film supporting means, the film supporting means in each pair being spaced from each other in a first direction and supporting the film movable in said first direction from one to the other of said film supporting means of said pair, and said plurality of pairs of film supporting means being arranged spaced from each other in a second direction substantially normal to said first direction so that said films are located in a plane; projector means having a pair of sections arranged spaced from and opposite each other and respectively on opposite sides of said plane; moving means operatively connected to said film supporting means for moving the same in said second direction so that any of said films may be selectively moved into the space between said pair of sections of said projector means, at least one of said sections being movable in a direction substantially normal to said plane toward the other of said other sections so that a film moved in the space between said sections will be engaged by the same when said movable section is moved toward the other of said sections and so that said film during movement thereof from one to the other of its support means may be projected by said projector means, said moving means comprising a pair of endless chains respectively located in two substantially parallel planes spaced from each other in said first direction and being operatively connected to said film supporting means for carrying the latter, a plurality of sprocket wheels engaging said endless chains for guiding the same, and drive means operatively connected to at least one of said sprocket wheels for turning the same about its axis, whereby by driving said endless chains only in one direction by said drive means any of said films may be selectively moved into the space between said pair of sections of said projector means.

2. An arrangement as defined in claim 1 in which each of said pairs of endless chains is supported on said sprocket wheels to form a double-U.

3. In a multiple film projector, in combination, at least one pair of film supporting means arranged spaced from each other and supporting a film in a substantially horizontal plane movably from one to the other of said supporting means; projector means having a pair of sections arranged spaced from and opposite each other respectively on opposite sides of the film and at least one of said pair of sections of said projector means being movable in a direction substantially normal to said plane towards the other of said sections to engage said film from opposite sides thereof so that said film during the movement thereof from one to the other of said film supporting means may be projected by said projector means; means for moving said film in said plane and including at least one pair of drive rollers respectively located on opposite sides of one of said sections and each having a toothed crown adapted to engage with perforations in said film, a drive shaft supporting said toothed crown freely rotatable thereon, and means movable with said movable section for coupling said crowns with the respective drive shaft during movement of said movable section normal to said plane toward the other of said sections; and resilient means mounted for movement with said movable section for pressing the film against the toothed crowns of said drive rollers before the latter are coupled to the drive shafts.

References Cited in the file of this patent

UNITED STATES PATENTS

| | | |
|---|---|---|
| 2,206,134 | Streyckmans | July 2, 1940 |
| 2,214,468 | Lannerd | Sept. 10, 1940 |
| 2,227,259 | Hokanson | Dec. 31, 1940 |
| 2,280,750 | Emerson | Apr. 21, 1942 |
| 2,290,071 | Rinaldy | July 14, 1942 |
| 2,345,869 | Edwards | Apr. 4, 1944 |
| 2,998,748 | Dessilani | Sept. 5, 1961 |